D. CLINE.
HEATING APPARATUS FOR VEHICLES.
APPLICATION FILED APR. 18, 1911.
1,052,318.
Patented Feb. 4, 1913.
3 SHEETS—SHEET 1.
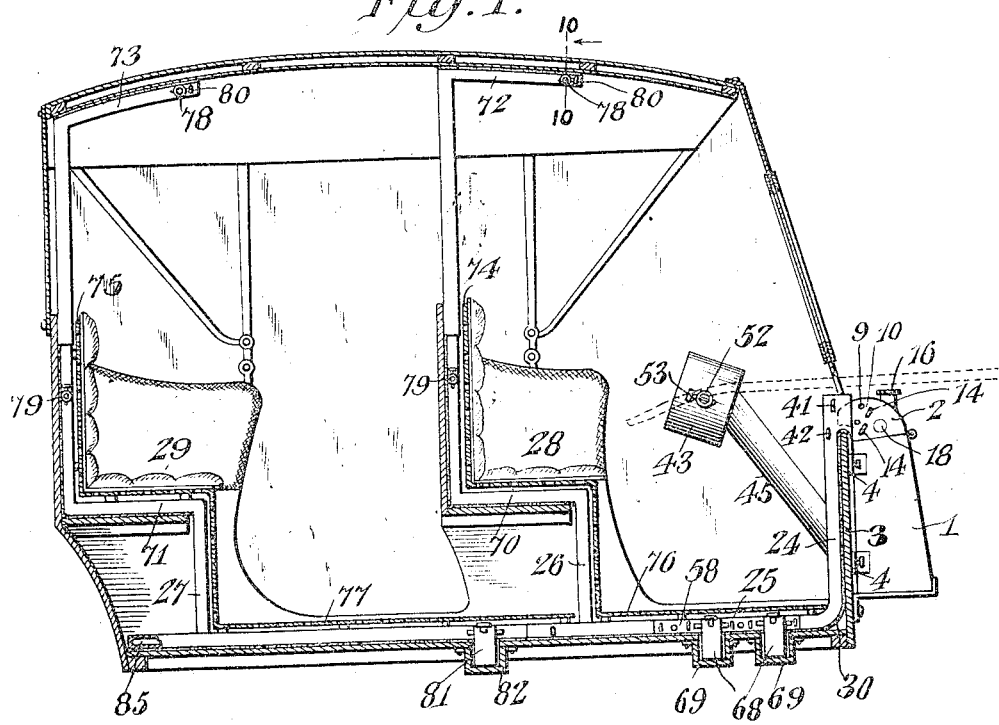
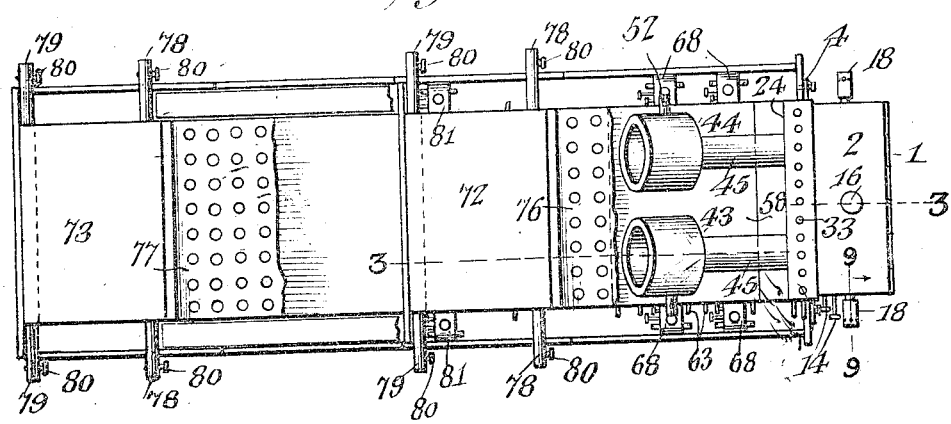
David Cline, Inventor
Witnesses D. CLINE.
HEATING APPARATUS FOR VEHICLES.
APPLICATION FILED APR. 18, 1911.
1,052,318.
Patented Feb. 4, 1913.
3 SHEETS—SHEET 2.
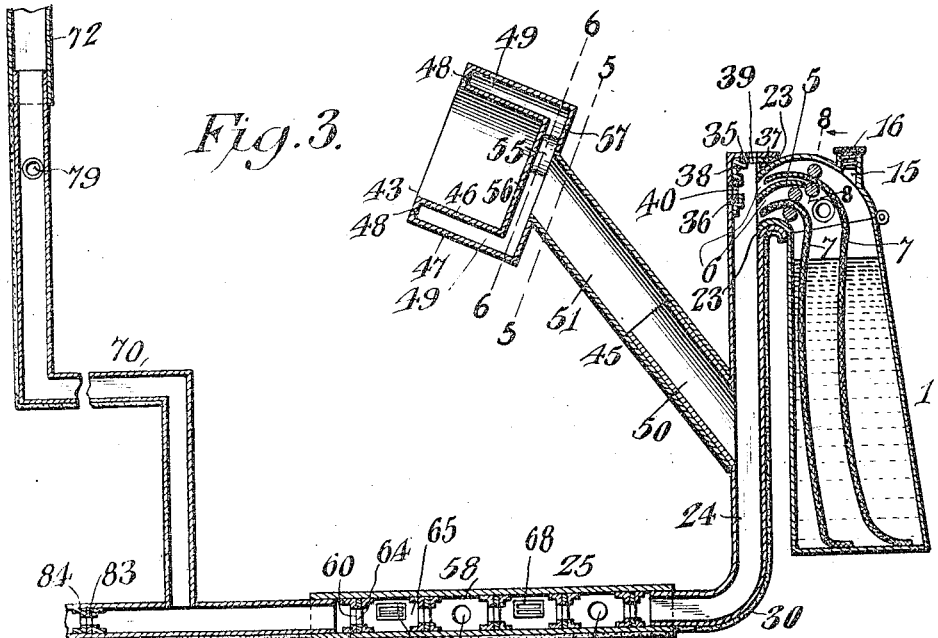
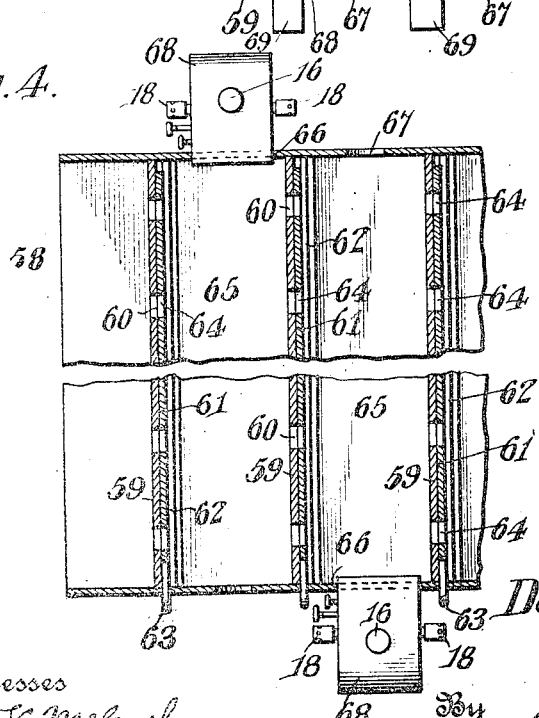
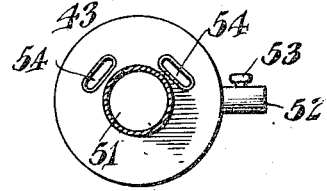
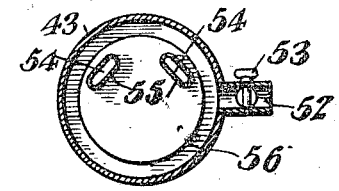
David Cline, Inventor

D. CLINE.
HEATING APPARATUS FOR VEHICLES.
APPLICATION FILED APR. 18, 1911.

1,052,318.

Patented Feb. 4, 1913.
3 SHEETS—SHEET 3.

UNITED STATES PATENT OFFICE.

DAVID CLINE, OF WATSONTOWN, PENNSYLVANIA.

HEATING APPARATUS FOR VEHICLES.

1,052,318.  Specification of Letters Patent.   Patented Feb. 4, 1913.

Application filed April 18, 1911. Serial No. 621,768.

*To all whom it may concern:*

Be it known that I, DAVID CLINE, a citizen of the United States, residing at Watsontown, in the county of Northumberland and State of Pennsylvania, have invented a new and useful Heating Apparatus for Vehicles, of which the following is a specification.

The invention relates to improvements in heating apparatus for vehicles.

The object of the present invention is to improve the construction of heating apparatus for carriages, wagons, sleighs and analogous vehicles, and to provide a simple, efficient and comparatively inexpensive heating apparatus, designed principally for the use of mail carriers, doctors, preachers and others, and adapted to be readily applied to a carriage or other vehicle, and capable of maintaining the same in a warm comfortable condition in extremely cold weather.

A further object of the invention is to provide a perfectly safe heating apparatus, in which the amount of heat may be controlled or regulated according to the weather, and which may be arranged for heating an entire carriage, or only the front portion thereof when the rear seat of a carriage is unoccupied.

The invention also has for its object to provide a heating apparatus, equipped with hand warmers, adapted to warm the hands of a person while driving without interfering with the free use of the lines.

With these and other objects in view, the invention consists in the construction and novel combination of parts hereinafter fully described, illustrated in the accompanying drawings, and pointed out in the claims hereto appended: it being understood that various changes in the form, proportion, size and minor details of construction, within the scope of the claims, may be resorted to without departing from the spirit or sacrificing any of the advantages of the invention.

In the drawings:—Figure 1 is a vertical longitudinal view of a carriage, equipped with a heating apparatus, constructed in accordance with this invention, the latter being partly in side elevation and partly in section. Fig. 2 is a plan view of the heating apparatus. Fig. 3 is an enlarged vertical sectional view of the front portion of the heating apparatus, the section being taken substantially on the line 3—3 of Fig. 2. Fig. 4 is an enlarged horizontal sectional view of the foot warmer section. Fig. 5 is a detail sectional view on the line 5—5 of Fig. 3. Fig. 6 is a similar view on the line 6—6 of Fig. 3. Fig. 7 is a detail perspective view of the top of the front upright dash board section of the heat conduit. Fig. 8 is an enlarged detail sectional view on the line 8—8 of Fig. 3. Fig. 9 is an enlarged sectional view on the line 9—9 of Fig. 2. Fig. 10 is a transverse sectional view on the line 10—10 of Fig. 1. Fig. 11 is a detail perspective view of one of the slidable dampers.

Like numerals of reference designate corresponding parts in all the figures of the drawings.

In the accompanying drawings in which is illustrated the preferred embodiment of the invention, 1 designates the main heating device consisting of a substantially oblong casing having its top portion 2 curved rearwardly and extending over the upper edge of the dash 3 of a carriage or other vehicle. The casing of the main heater forms a reservoir for a suitable burning fluid, such as oil, and it is provided at opposite sides with laterally projecting ears 4, preferably formed by L-shaped plates or pieces and bolted or otherwise secured to the front face of the dash, as clearly shown in Fig. 1 of the drawings. The rearwardly curved top is provided with a transverse partition 5, curved to conform to the curvature of the top and dividing the same into a pair of wick passages 6 in which the upper ends of wicks 7 are arranged. The casing of the heater extends to within a short distance of the plane of the sides of the carriage body, and the wicks are of substantially the width of the heater and while the main heater 1 is shown equipped with two wicks, it will be readily understood that either one or more may be employed according to the climate in which the heating apparatus is to be used. Each wick passes between a pair of rollers 9 and 10, provided with intermediate and end enlargements 11, having projections or teeth 12, which are embedded in the wick, whereby the rollers engage and are adapted to positively and uniformly move the wick in raising or lowering the same. The wick engaging rollers 9 and 10 are journaled in suitable bearings of the sides or ends of the casing of the heater, and the roller 10 is provided at one end with an extension 13, having a suitable handle or finger piece 14 by means of which it may be readily rotated. When the roller 10 is rotated, motion is also communicated to the other roller 9, and by employing the intermediate and end enlargements 11, a comparatively wide wick may be supported in proper position and uniformly raised or lowered. The number of toothed enlargements, however, may be varied to suit the width of the wick. A suitable filling orifice 15 is arranged at the top portion of the casing and is normally closed by a removable screw plug or cap 16.

No claim is made in this application to the particular construction of the heater.

In order to prevent gases arising from the oil or other burning fluid from being forced outward to the flames of the wicks, the main heater is equipped at opposite sides or ends with safety valves, each consisting of a fixed tube 17, and a slidable tubular closure 18. The tube 17 is open at each end and communicates at its inner end with the interior of the casing of the heater, and the slidable tubular closure 18, which is fitted on the tube 17, is provided with an outer end wall 19, which normally closes the outer end of the tube 17. When the gases within the heater create a pressure, the slidable closure is moved outwardly to the dotted position illustrated in Fig. 9, which carries apertures 20 beyond the end of the tube 17 and thereby uncovers the said apertures, which permits the escape of the gases and prevents the same from being forced outward to the flames of the wicks. The slidable movement of the closure 18 is limited by a pin 21, projecting inwardly from the said closure and operating in a slot 22 of the tube 17. The safety valves are adapted to prevent explosions, which might result if such gases were forced outwardly through the wick passages to the lighted ends of the wicks. An annular series of the perforations 20 is preferably provided to afford an outlet of considerable area. If desired the safety valves may remain open to permit the free escape of the gases accumulating within the casing.

The curved top or burner portion of the heater extends into a front opening 23 of a front dash section or branch 24 of a heat conduit 25, constructed of sheet metal or other suitable material, and extending down the dash 3 and along the bottom of the vehicle and provided with intermediate and rear upright seat heating portions 26 and 27, located at the front and rear seats 28 and 29 of the vehicle. The heat conduit 25 is approximately oblong in cross section, being composed of upper and lower walls and side connecting walls, and it is designed to be sufficiently strong to bear the weight of the occupants of a carriage or other vehicle. A lining 30 of asbestos or similar material is interposed between the heat conduit and the contiguous portions of the vehicle to prevent injury to the latter and also waste of heat. The front dash section 24 extends above the dash and is provided with a forwardly projecting top portion 31, having the opening 23 and provided with a curved bottom wall 32, which hooks over the upper edge of the dash. The enlarged top portion of the dash section 24 of the heat conduit is provided with top and rear perforations 33 and 34, adapted to supply air to the burner of the heater to support combustion, and the inlet of the air is controlled by dampers 35 and 36, arranged within the dash section 24 and fitted against the top and rear walls of the same and slidably mounted in suitable guides 37 and 38. The perforations 33 and 34 are arranged in transverse series, and the dampers are provided at intervals with openings 39 and 40, adapted to register with the openings of the dash section. The dampers are adapted to close or partially close the openings, and they also afford a view of the burner so that the size of the flame may be seen. The dampers are provided with exteriorly arranged handles 41 and 42, consisting of rods piercing one of the side walls of the dash section 24 and having angularly bent terminals, as clearly illustrated in Fig. 7 of the drawings. Any other form of handle may of course be provided for operating the dampers.

The vehicle dash section 24 of the heat conduit supports a pair of hand warmers 43 and 44, each consisting of an inclined flue 45 and a cylindrical cup-shaped casing arranged at and communicating with the upper end of the flue and consisting of inner and outer cylindrical shells 46 and 47, arranged in spaced relation, as clearly shown in Fig. 3 of the drawings, and connected at their rear edges by an annular wall or ring 48. The cylindrical casing, which is set at an inclination, is open at the back and provides a cylindrical cavity or space to receive the hands of a person. The annular space 49, which surrounds the inner shell, communicates with the flue 45, which is composed of two telescopic sections to permit the flue to be extended. The lower fixed section 50 of the flue 45 is fixed to and communicates with the interior of the dash section 24, and the slidable section 51, which is connected with the cylindrical casing, is adapted to move upwardly and downwardly on the fixed section 50. The flue 45 extends upwardly and rearwardly, and its adjustment enables the cylindrical casing to be arranged at the desired elevation. The hand receiving casing of the hand warmer may be rectangular or of any other configuration, and a short flue 52 extends laterally from the casing at the outer side thereof, and is provided with a suitable damper 53 for controlling the draft through the flue 45. The draft through the flue will cause the heat to ascend to the casing of the hand warmer, which may be maintained at the desired temperature by regulating the damper 53. The hand warmer 43 at the right hand side of the vehicle is provided with opposite openings 54, adapted to receive the lines to permit the person driving to keep his hands within the cylindrical casing without releasing the lines. The line openings 54 are formed by short approximately elliptical tubes 55, located at points between the flue 45 and the inner cylindrical shell 46 and piercing the front walls 56 and 57 of the same. The hand warmer at the left hand side of the vehicle may, of course, be provided with rein receiving openings if desired.

No claim is made in the present application to the particular construction of hand warmer.

The heat conduit 25 is provided at the bottom at a point in advance of the front seat with a foot warmer section 58, but such a section may also be arranged between the front and rear seats for warming the feet of the occupants of the rear seat. The foot warmer section 58 is divided into a plurality of transverse compartments by means of partitions 59, having perforations 60 adapted to be exposed, closed or partially closed by slidable dampers 61, mounted in suitable guides 62 and having extended handles 63, piercing one of the side walls of the foot warmer section, as clearly illustrated in Fig. 4 of the drawings. The slidable dampers are provided with apertures 64, which are adapted to register with the perforations or apertures 60 of the fixed partitions 59. Each transverse compartment 65 is provided at one end with a lamp receiving opening 66 and at the opposite end with an outlet 67 for the escape of the products of combustion from the lamp or supplemental heater 68. The openings 66 and 67 of the compartments are alternately arranged to locate the auxiliary lamps or heaters 68 alternately at opposite sides of the vehicle in order to afford greater access to the same. The auxiliary lamps or heaters 68 are constructed similar to the main lamp or heater, but on a smaller scale, and they are seated in sockets formed by metallic boxes 69, preferably constructed of cast metal and secured to the bottom of the body of the vehicle and depending from openings thereof. By means of the dampers, the passage of the heat through the foot warmer section 58 may be more or less retarded so as to heat the foot warmer to the desired temperature, and the supplemental lamps or heaters will enable the temperature of the foot warmer to be raised to the desired degree. Also the supplemental lamps or heaters will co-act with the main lamp or heater in maintaining the desired temperature within the carriage.

The intermediate and rear upright portions 26 and 27 of the heat conduit are arranged at the front and rear seats of the vehicle, and they consist of upper and lower vertical portions and horizontal connecting portions 70 and 71, arranged upon the seats of the carriage beneath the cushions thereof between the cushions and the framework of the seats. The upper vertical portions extend upward at the backs of the seats to the top of the vehicle, and are preferably provided with forwardly extending branches or portions 72 and 73 for heating the air at the top of the vehicle. In order to prevent the seats from becoming too hot, the heating apparatus is equipped at the said seats with angular guards 74 and 75, consisting of perforated sheets of metal or other suitable material, arranged in spaced relation with the upwardly extending portions of the heat conduit and receiving the cushions of the front and rear seats, as clearly shown in Fig. 1 of the drawings. Each of the guards 74 and 75 is composed of upper and lower vertical portions and a horizontal connecting portion, and the said guards are provided at the bottom with horizontal extensions 76 and 77, located above the bottom portion of the heat conduit and adapted to prevent the feet of the occupants of the vehicle from coming in contact with the heated surfaces of the heat conduit 25. The upwardly extending intermediate and rear portions 26 and 27 are adapted to create sufficient draft to draw the heat and other products of combustion through the heat conduit, and they are provided at the top extensions 72 and 73 and at points adjacent to the backs of the seats with opposite short horizontal flues 78 and 79, extending laterally from the vehicle and equipped with suitable dampers 80 for controlling the escape of the products of combustion and the consequent circulation of the same through the heat conduit. While the intermediate and rear upright portions 26 and 27 are shown extending to the top of the vehicle, they may terminate adjacent to the upper edges of the backs of the seats or at the flues 79.

The bottom portion of the heat conduit 25 is provided at a point in rear of the intermediate upwardly extending portion 26 with side apertures for the reception of supplemental lamps or heaters 81, which are seated in sockets formed by metallic boxes 82. A slidable damper 83 is arranged in advance of the auxiliary heaters 81 and is adapted to cut out or cut off the rear portion of the heating apparatus when the rear seat is unoccupied. The metallic boxes 82 are constructed similar to those heretofore described, and the damper 83, which is mounted in a suitable guide, is provided at intervals with perforations and coöperates with a partition 84, constructed similar to the transverse partitions 59 and having perforations, adapted to be exposed, covered or partially covered by the damper. The heat conduit 25 is provided at the bottom with a rear extension 85, which will be found of considerable advantage when the apparatus is applied to a sleigh or wagon open at the back, as a person occupying this portion of the vehicle will be warmed by the heating apparatus.

The heating apparatus is adapted for use in all kinds of vehicles, such as sleighs, wagons, automobiles and the like, and the heat conduit may be provided at any point or points within such a vehicle with extensions for warming such portions of the vehicle.

Having thus fully described my invention, what I claim as new and desire to secure by Letters Patent, is:—

1. In an apparatus of the class described, the combination with a vehicle having a dash, of a heater provided with means for securing it to the front of the dash of the vehicle and having a rearwardly extending top portion arranged to project over the upper edge of the dash and provided with an opening forming a wick passage, and a heat conduit located within the vehicle and having a front upright portion fitted against the dash and receiving the rearwardly extending portion of the heater.

2. In an apparatus of the class described, the combination with a vehicle having a dash, of a heater provided with means for securing it to the front of the dash of the vehicle and having a rearwardly projecting burner arranged to extend over the upper edge of the dash, a heat conduit located within the vehicle and having an upright front portion arranged at the inner face of the dash, said upright portion being enlarged at the top to extend over the dash and having a front opening receiving the projecting portion of the burner.

3. In an apparatus of the class described, the combination with a vehicle having a dash, of a heater provided with means for securing it to the front of the dash of the vehicle and having a rearwardly extending burner, and a heat conduit located within the vehicle and provided with an upright front portion arranged at the front of the dash and receiving the projecting burner of the heater and having apertures at the top, and a damper coöperating with the apertures to regulate the inlet of air to the burner.

4. In an apparatus of the class described, the combination with a vehicle having a dash, of a heater provided with means for mounting it on the front of the dash of the vehicle and provided at the top with a rearwardly projecting burner, a heat conduit located within the vehicle and having an upright front portion arranged adjacent to the inner face of the dash and enlarged at the top and provided with a front opening receiving the burner, the top enlargement of the heat conduit being also provided with upper and rear openings for the admission of air, and slidable dampers coöperating with the top and rear openings for controlling the inlet of air.

5. In an apparatus of the class described, the combination with a vehicle, of a heat conduit provided with a plurality of transverse partitions forming separate compartments and having damper controlled apertures, said conduit being provided at one end of each compartment with a lamp receiving opening and having an aperture at the other end of each compartment, a main heater discharging into the heat conduit, and lamps arranged at the lamp receiving openings and discharging into the said compartments.

6. In an apparatus of the class described, the combination with a vehicle, of a heat conduit provided with a plurality of transverse partitions forming separate compartments and having damper controlled apertures, said conduit being provided at one end of each compartment with a lamp receiving opening and having an aperture at the other end of each compartment, a main heater discharging into the heat conduit, lamps arranged at the lamp receiving openings and located alternately at opposite sides of the heat conduit and discharging into the said compartments, and means for supporting the lamps.

7. In an apparatus of the class described, the combination with a vehicle, of a heat conduit provided with a plurality of transverse partitions forming separate compartments and having apertures, said heat conduit being provided at one end of each compartment with an outlet and having a lamp receiving opening at the opposite end of each compartment, dampers for controlling the passage of heat through the apertures, boxes mounted below the lamp receiving openings, a main heater discharging into the heat conduit, and lamps seated in and supported by the boxes and extending into the lamp receiving openings of the heat conduit and discharging into the said compartments.

8. In an apparatus of the class described, the combination with a vehicle having a dash and provided with a seat including a framework and cushions, of a heater provided with means for securing it to the outer or front face of the dash, and a heat conduit extending along the bottom of the vehicle and provided with a front upright portion arranged at the inner face of the dash and connected at the top with the said heater, said conduit being also provided with a seat warming portion extending upwardly at the front of the seat and rearwardly over the top of the seat and then upwardly at the back of the seat and conforming to the configuration of the latter and arranged upon the framework of the seat between the same and the cushions, said heat warming portion forming a chimney or stack to create a down draft through the said upright front portion.

9. In an apparatus of the class described, the combination with a vehicle provided with a dash, a seat and a top, of a heater having means for securing it to the front or outer face of the dash, and a heat conduit extending along the bottom of the vehicle and having a front upright portion arranged at the inner face of the dash and connected at the top with the heater, said conduit being also provided with a portion extending upwardly at the front of the seat and rearwardly at the top of the seat and then upwardly at the back of the seat to the top of the vehicle to form a stack to create a down draft in the front upright portion and provided thereat with lateral outlets for the products of combustion.

10. In an apparatus of the class described, the combination with a vehicle having a seat, of a heater, a heat conduit including a bottom portion extending along the bottom of the vehicle, and an upright section having vertical and horizontal portions to fit the front and top of the seat of the vehicle and extending upwardly at the back of the seat and provided at the top with a forwardly projecting extension arranged beneath the top of the vehicle and having a lateral outlet.

11. In an apparatus of the class described, the combination with a vehicle having a dash and provided with front and rear seats, of a heater provided with means for mounting it at the front of the dash of the vehicle, a heat conduit connected with the heater and comprising a horizontal bottom portion adapted to fit the bottom of a vehicle, and intermediate and rear upright portions constructed to fit the front and rear seats of the vehicle, and a damper extending across the heat conduit and located at a point between the intermediate and rear portions for cutting off the heat from the rear portion of the heat conduit.

12. In an apparatus of the class described, the combination with a vehicle having a dash and provided with front and rear seats, of a main heater provided with means for mounting it in front of the dash of the vehicle, a heat conduit connected with the heater and comprising a horizontal bottom portion, a front upright branch arranged at the inner face of the dash and connected with the main heater, intermediate and rear upright portions arranged to fit the front and rear seats of the vehicle, and auxiliary heaters arranged at opposite sides of the bottom portion of the heat conduit and communicating with the same.

In testimony that I claim the foregoing as my own, I have hereto affixed my signature in the presence of two witnesses.

DAVID CLINE.

Witnesses:
JOHN E. KENNEDY,
RALPH L. BELFORD.